US010817286B2

(12) United States Patent
Shin

(10) Patent No.: US 10,817,286 B2
(45) Date of Patent: Oct. 27, 2020

(54) APPARATUS AND METHOD FOR TRACKING AND MANAGING CODE CHANGE AMONG MULTIPLE PROJECTS

(71) Applicant: KOREA AEROSPACE RESEARCH INSTITUTE, Daejeon (KR)

(72) Inventor: Hyun-Kyu Shin, Sejong-si (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 175 days.

(21) Appl. No.: 16/190,888

(22) Filed: Nov. 14, 2018

(65) Prior Publication Data

US 2019/0146787 A1 May 16, 2019

(30) Foreign Application Priority Data

Nov. 14, 2017 (KR) ........................ 10-2017-0151525

(51) Int. Cl.
| G06F 9/44 | (2018.01) |
| G06F 8/77 | (2018.01) |
| G06F 8/71 | (2018.01) |

(52) U.S. Cl.
CPC . *G06F 8/77* (2013.01); *G06F 8/71* (2013.01)

(58) Field of Classification Search
CPC ....................................................... G06F 9/44
See application file for complete search history.

(56) References Cited

U.S. PATENT DOCUMENTS

| 6,993,710 B1* | 1/2006 | Coad ........................ G06F 8/71 |
| | | 715/202 |
| 2012/0278357 A1 | 11/2012 | Creem |
| 2014/0090067 A1* | 3/2014 | Tripp .................... G06F 21/577 |
| | | 726/25 |

(Continued)

FOREIGN PATENT DOCUMENTS

KR       20100064589 A       6/2010

OTHER PUBLICATIONS

Telea, A. et al., "Code Flows: Visualizing Structural Evolution of Source Code," Eurographics, vol. 27, No. 3, Sep. 29, 2008, 8 pages.

(Continued)

*Primary Examiner* — Jae U Jeon
(74) *Attorney, Agent, or Firm* — McCoy Russell LLP

(57) ABSTRACT

Provided is a method and apparatus for tracking and managing a code change between multiple projects. The apparatus includes a code management unit for generating function flow graphs by analyzing a structural and functional flow and annotated annotation from the project code input to a code management unit, comparing the generated function flow graphs for respective projects, and tracking changes based on information recorded in annotation formed by annotating the difference and changes deduced via comparison and generating a change tracking result, a change management unit for providing information on requirement and an ID by the request for a change of additional information as annotated annotation, receiving the change tracking result from the code management unit, and managing the (Continued)

change tracking result, and a display element for receiving the change tracking result from the code management unit and displaying the change tracking result on a monitor.

12 Claims, 4 Drawing Sheets

(56) References Cited

U.S. PATENT DOCUMENTS

2017/0109331 A1\* 4/2017 Bonazzoli ............. G06F 40/194
2017/0212752 A1   7/2017 Ekambaram et al.

OTHER PUBLICATIONS

"How to make git diff ignore comments," Stack Overflow Website, Available Online at https://stackoverflow.com/questions/16527215/how-to-make-git-diff-ignore-comments, Available as Early as Jan. 1, 2014, 4 pages.

European Patent Office, Extended European Search Report Issued in Application No. 18206246.3, dated Mar. 29, 2019, Germany, 10 pages.

\* cited by examiner

FIG. 2

```
[Project 1]
void method1()
{
    ...
    /*
        @CR: 123
    */
    if( a > 100 )  /* 100 for Project 1 */
    {
        ...
    }
    ...
    /*
        @CR: 125
        @SUP_NDIFF
    */
    if( b < 200 )
    {
        ...
    }
    printf("Done");
    ...
}
```

```
[Project 2]
void method1()
{
    ...
    /*
        @CR: 123
    */
    if( a > 125 )  /* 125 for Project 2 */
    {
        ...
    }
    ...
    printf("Done");
    ...
}
```

APPARATUS AND METHOD FOR TRACKING AND MANAGING CODE CHANGE AMONG MULTIPLE PROJECTS

CROSS-REFERENCE TO RELATED APPLICATIONS

This application claims priority to Korean Patent Application No. 10-2017-0151525, filed on Nov. 14, 2017, in the Korean Intellectual Property Office. The entire contents of the above-listed application are hereby incorporated by reference in their entirety for all purposes.

TECHNICAL FIELD

The following disclosure relates to tracking and management of a change in software, and a method and apparatus for tracking and managing a code change between multiple projects, for effectively tracking changes to be applied to multiple projects.

BACKGROUND

Geostationary multi-functional satellites nos. 2A and 2B have been developed with almost the same structure except for different payloads. The satellites have similar software mounted thereon but are different in terms of some points due to the characteristics of the respective satellites.

In general, during the development procedure of the satellite, two projects have similar code bases, but independently maintain and manage codes when development is achieved in some degree.

When a code needs to be changed according to correction of a concept of management of a satellite, additional requirements, or the like, all related contents need to be applied to the two projects in many cases, and the related contents are not simultaneously applied in many actual cases depending on a development and verification procedure.

In general, a code is changed and corrected using commercial Diff tools and, in this regard, when codes of different projects are compared, even if the codes are the same in terms of a structure and a function, the two codes may be determined to be different due to a nonfunctional difference such as a project title.

Accordingly, when a code change is managed using such a physical difference between codes, even if a plurality of projects with similar code bases are simultaneously performed, a developer has difficulty in effectively tracking changes over multiple projects.

Accordingly, there is a need to develop technology for effectively tracking and managing a code change between multiple projects that are simultaneously performed by analyzing a processing flow instead of a simple physical difference via analysis of a code structure and tracking and managing similarity and a change in codes between projects.

SUMMARY

An embodiment of the present disclosure is directed to providing a method and apparatus for tracking and managing a code change between multiple projects, for effectively tracking and managing a code change between multiple projects that are simultaneously performed by analyzing a processing flow instead of a simple physical difference via analysis of a code structure and tracking and managing similarity and a change in codes between projects.

It is to be understood that both the foregoing general description and the following detailed description of the present disclosure are exemplary and explanatory and are intended to provide further explanation.

In one general aspect, an apparatus of tracking and managing a code change between multiple projects includes a code management unit for generating function flow graphs by analyzing a structural and functional flow and annotated annotation from the project code input to a code management unit, comparing the generated function flow graphs for respective projects, and tracking changes based on information recorded in annotation formed by annotating the difference and changes deduced via comparison and generating a change tracking result, a change management unit for providing information on requirement and an ID by the request for a change of additional information as annotated annotation, receiving the change tracking result from the code management unit, and managing the change tracking result, and a display element for receiving the change tracking result from the code management unit and displaying the change tracking result on a monitor.

The code management unit may include a flow graph generator for generating function flow graphs by analyzing a structural and functional flow and annotated annotation from the input project code, a flow graph comparator for comparing the generated function flow graphs for respective projects, and a changes tracker for tracking changes based on information recorded in annotation formed by annotating the difference and changes deduced by the flow graph comparator and generating a change tracking result.

The changes tracker may receive the information on requirement and an ID by the request for a change as annotated annotation from a change management unit, may transmit a change tracking result to the change management unit, and may transmit the change tracking result to the display element.

The code management unit may insert specific characters into the annotated additional information without recognition of a change and difference between project codes by a flow graph comparator, with respect to a change and difference intended by a developer.

The flow graph generator generates a function flow graph for each project code and generates the function flow graphs based on a functional flow of the code instead of a physical difference between codes to track a change in code while avoiding an effect based on a nonfunctional difference during comparison between projects.

In another general aspect, a code management apparatus of tracking and managing a code change between multiple projects includes a flow graph generator for generating function flow graphs by analyzing a structural and functional flow and annotated annotation from an input project code, a flow graph comparator for comparing the generated function flow graphs for respective projects, and a changes tracker for tracking changes based on information recorded in annotation formed by annotating the difference and changes deduced by the flow graph comparator, generating a change tracking result, and transmitting the change tracking result to a change management unit or transmitting the change tracking result to a display element.

The code management apparatus may insert specific characters into the annotated additional information without recognition of a change and difference between project codes by a flow graph comparator, with respect to a change and difference intended by a developer.

The flow graph generator may generate a function flow graph for each project code and may generate the function flow graphs based on a functional flow of the code instead of a physical difference between codes to track a change in code while avoiding an effect based on a nonfunctional difference during comparison between projects.

In another general aspect, a method of tracking and managing a code change between multiple projects includes receiving information on requirement and an ID by the request for a change of additional information annotated in a project code from a change management unit, by a code management unit, generating function flow graphs by analyzing a structural and functional flow and annotated annotation from the project code input to the code management unit, comparing the generated function flow graphs for respective projects to deduce a difference and changes, tracking changes based on information recorded in annotation formed by annotating the difference and changes deduced in the comparing and generating a change tracking result, and receiving the generated change tracking result and displaying the change tracking result on a monitor.

The tracking of the changes may further include receiving the change tracking result from a code management unit and managing the change tracking result, by a change management unit.

The comparing of the function flow graphs may include inserting specific characters into the annotated additional information without recognition of a change and difference between project codes by a flow graph comparator, with respect to a change and difference intended by a developer.

The generating of the function flow graphs may include generating a function flow graph for each project code and generating the function flow graphs based on a functional flow of the code instead of a physical difference between codes to track a change in code while avoiding an effect based on a nonfunctional difference during comparison between projects.

In another general aspect, a code management method of tracking and managing a code change between multiple projects includes generating function flow graphs by analyzing a structural and functional flow and annotated annotation from a project code input to a code management unit, comparing the generated function flow graphs for respective projects to deduce a difference and changes, and tracking changes based on information recorded in annotation formed by annotating the difference and changes deduced in the comparing, generating a change tracking result, and transmitting the change tracking result to a change management unit or transmitting the change tracking result to a display element.

The comparing of the function flow graphs may include inserting specific characters into the annotated additional information without recognition of a change and difference between project codes by a flow graph comparator, with respect to a change and difference intended by a developer.

The generating of the function flow graphs may include generating a function flow graph for each project code and generating the function flow graphs based on a functional flow of the code instead of a physical difference between codes to track a change in code while avoiding an effect based on a nonfunctional difference during comparison between projects.

In another general aspect, there is provided a computer readable recording medium in which a program for executing the method of tracking and managing a code change between multiple projects is recorded.

BRIEF DESCRIPTION OF THE DRAWINGS

FIG. 2 is a diagram showing an example of a code structure for tracking a change.

DETAILED DESCRIPTION OF EMBODIMENTS

Figure 1:
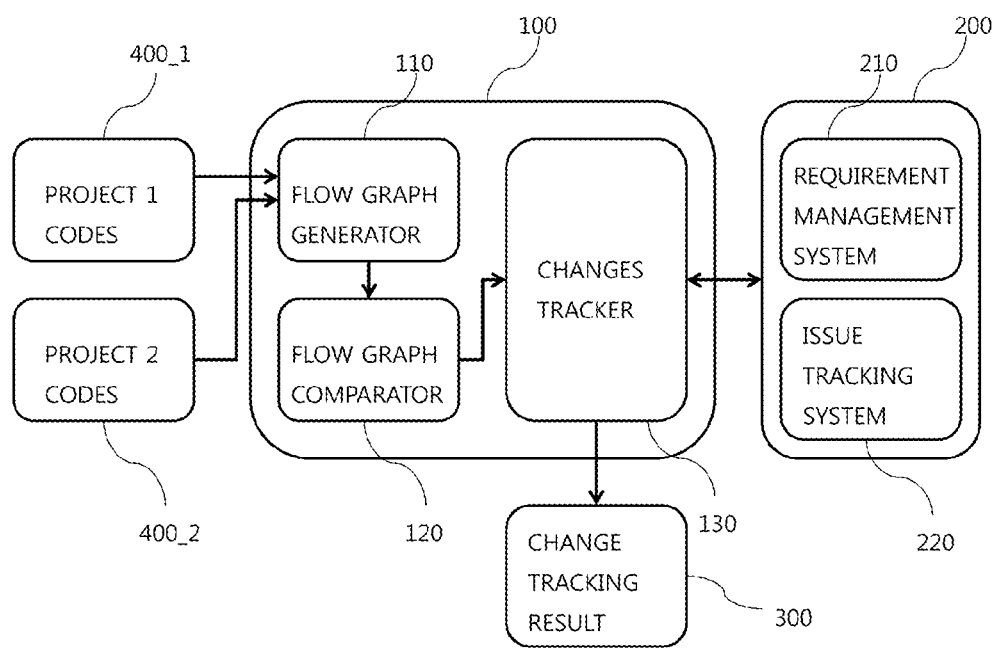
FIG. 1 is an apparatus for tracking and managing a code change between multiple projects according to an exemplary embodiment of the present disclosure.

The described systems and methods allow for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, certain detailed explanations of related art are omitted when it is deemed that they may unnecessarily obscure the disclosure.

The terms used in the present specification are used for explaining a specific exemplary embodiment, not limiting the present inventive concept. Thus, the singular expressions in the present specification include the plural expressions unless clearly specified otherwise in context. Also, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

According to an exemplary embodiment of the present disclosure, an apparatus of tracking and managing a code change between multiple projects includes a code management unit for generating function flow graphs by analyzing a structural and functional flow and annotated annotation from the project code input to a code management unit, comparing the generated function flow graphs for respective projects, and tracking changes based on information recorded in annotation formed by annotating the difference and changes deduced via comparison and generating a change tracking result, a change management unit for providing information on requirement and an ID by the request for a change of additional information as annotated annotation, receiving the change tracking result from the code management unit, and managing the change tracking result, and a display element for receiving the change tracking result from the code management unit and displaying the change tracking result on a monitor.

The method of tracking and managing a code change between multiple projects may generate flow graphs and compare two projects with a focus on a functional flow of a code instead of a physical difference between codes and may track a code change without avoiding an effect based on a nonfunctional difference. In addition, a change and difference intended by a developer may not be reported any longer through a function of ignoring a difference between projects using annotation (additional information) even if there is the difference between projects. In addition, the reason and description of a change, an identifier (ID) by the request for a change, or the like may be recorded in the annotation and changes may be effectively tracked in association with a requirement management system and an issue tracking system.

FIG. 1 is an apparatus for tracking and managing a code change between multiple projects according to an exemplary embodiment of the present disclosure. FIG. 2 is a diagram showing an example of a code structure for tracking a change.

As shown in FIG. 1, an apparatus 1000 for tracking and managing a code change according to the present disclosure may include a code management unit 100 for extracting changes from a project code and a change management unit 200 for managing requirement and changes.

The code management unit 100 may include a flow graph generator 110, a flow graph comparator 120, and a changes tracker 130. As necessary, the code management unit 100 may be referred to as a code management device.

The flow graph generator 110 may receive project codes (Project 1 codes 400_1 and Project 2 codes 400_2) and may analyze a structural and functional flow and annotation (additional information) of the code to generate function flow graphs for respective project codes. The annotation refers to additional information that is annotated in a project code. To generate the function flow graphs, the annotation of the project code is assumed to pre-record the reason and description of a change, an identifier (ID) by the request for a change, or the like. When the flow graphs are generated and two projects are compared with a focus on a functional flow of a code instead of a physical difference between codes, a code change may be tracked while avoiding an effect based on a nonfunctional difference during comparison between two projects. Even if there is a difference between projects, specific characters (@SUP_MDIFF) may be inserted into the annotation (additional information) to ignore the difference using the annotation (additional information), as shown in FIG. 2 and, thus, a change and difference intended by a developer may not be reported any longer.

The flow graph comparator 120 may compare function flow graphs for each of the projects generated by the flow graph generator 110 to extract a difference and changes between the function flow graphs.

The changes tracker 130 may track the difference and changes extracted through the flow graph comparator 120 based on information recorded in the annotation in association with the change management unit 200. To this end, the changes tracker 130 may receive the annotated requirement and ID by the request for a change, from the change management unit 200, may generate a change tracking result, and may transmit the change tracking result to the change management unit 200. In addition, the changes tracker 130 may transmit the generated change tracking result to a display element 300.

The display element 300 may display the received change tracking result on a monitor.

The change management unit 200 may include a requirement management system 210 and an issue tracking system 220, may provide information on the annotated requirement and ID by the request for a change to the changes tracker 130, may receive changes from the changes tracker 130, and may aggregate and manage the changes.

The requirement may refer to a service that needs to be provided by corresponding software in association with software development, constraints required to operate software or during an operation of software, or the like and may include various requirements associated with the development of other software.

The annotation (additional information) may include information for identifying changes or requirement and may refer to information associated with changes or requirement.

In addition, the additional information may be present in an annotation in a source code not to exert an effect during compiling or execution of the source code and may be expressed in various methods depending on a development environment, a development language, a preprocessor, a compiler, or the like.

The requirement management system 210 may include a preprocessing unit for interpreting additional information related to requirement present in an annotation in a source code to recognize a relationship between the source code and the requirement, and a requirement managing unit for analyzing a current situation in which the requirement is applied to the source code based on the relationship between the source code and the requirement.

The issue tracking system 220 may provide information on the requirement and ID by the request for a change of annotation (additional information) to the changes tracker 130, may receive changes from the changes tracker 130, and may collect and manage the changes. The issue tracking system 220 may make a request to a requirement management system for information on requirement, may receive the information, and may provide the requirement to a changes tracker or the issue tracking system 220 may provide only information on the ID by the request for a change to the changes tracker, and the requirement management system 210 may provide the information on requirement directly to the changes tracker 130.

As shown in an example of a code structure for change track of FIG. 2, in the case of method1 of Project 1 and Project 2, Annotation indicates that the first if clause is from Change Request (CR) 123. An annotating method may have different forms according to a used language or developer's preference and C language includes an annotation with the form of /*-*/. Annotation about CR 123 may indicate a function performed by the first if clause and related changes, may be indicated in association with the first if clause through a method added above or below the first if clause and, the present embodiment is described below assuming a method of adding annotation to a corresponding function module (e.g., the first if clause). The function module may be one unit that performs an independent function and may be, for example, a function or a class.

The second if clause according to CR 125 is present in a code of Project 1 and a corresponding part is omitted in Project 2. When CR 125 is Change Request associated only with Project 1, annotation may be added not to examine changes during a code change comparison between projects such as @SUP_MDIFF, as shown in FIG. 2. A change and difference intended by a developer does not need to be reported any longer through a function of ignoring a difference between projects using annotation (additional information) even if there is the difference between projects. When this information (@SUP_MDIFF) is not added, information indicating that CR 125 is not applied to Project 2 may be displayed by a changes tracker through a display element.

Figure 3:
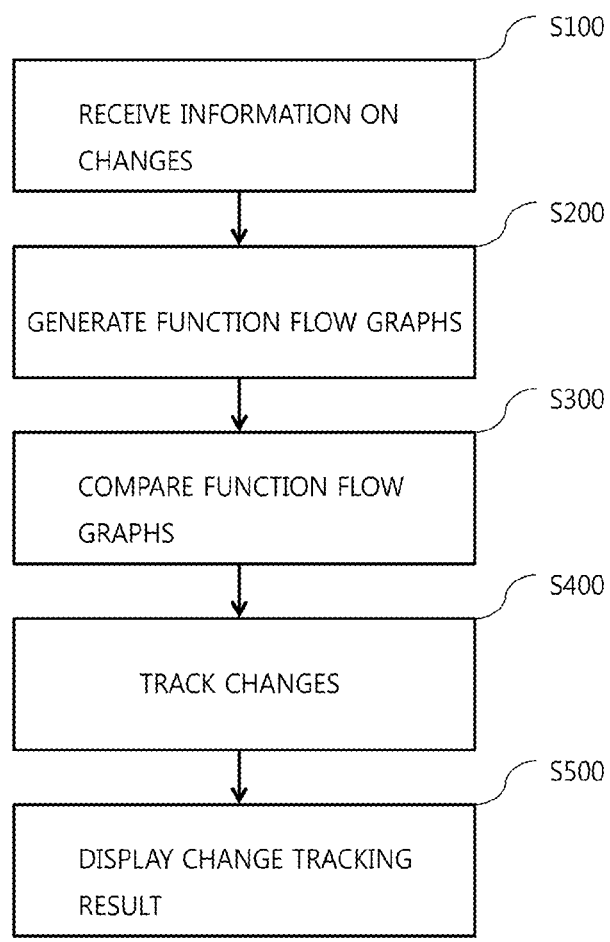
FIG. 3 is a diagram showing a method of tracking and managing a code change between multiple projects according to another embodiment of the present disclosure.

FIG. 3 is a diagram showing a method of tracking and managing a code change between multiple projects according to another embodiment of the present disclosure.

As shown in FIG. 3, the method of tracking and managing a code change according to the present disclosure may include receiving information on changes (S100), generating function flow graphs (S200), comparing the function flow graphs (S300), tracking changes (S400), and displaying a change tracking result (S500).

A method of tracking and managing a code change between multiple projects according to another embodiment of the present disclosure may include receiving information on requirement and an ID by the request for a change of additional information annotated in a project code from a change management unit, by a code management unit (S100), generating function flow graphs by analyzing a structural and functional flow and annotated annotation from the project code input to the code management unit (S200), comparing the generated function flow graphs for respective projects to deduce a difference and changes (S300), tracking changes based on information recorded in annotation formed by annotating the difference and changes deduced in the comparing and generating a change tracking result (S400), and receiving the generated change tracking result and displaying the change tracking result on a monitor (S500).

Hereinafter, constituent operations are described in detail.

In the receiving of the information on changes (S100), the changes tracker 130 may receive information on requirement and ID by the request for a change as an annotation (additional information) in the project code from the change management unit 200. The annotation may be assumed to pre-record the reason and description of a change, an identifier (ID) by the request for a change, or the like. The annotation refers to additional information that is annotated in a project code.

In the generating of the function flow graphs (S200), the flow graph generator 110 may receive project (Project 1 and Project 2) codes, may analyze a structural and functional flow and Annotation (additional information) of a code to generate a function flow graph for each project code. The function flow graph may be generated based on a code functional flow between codes to track a change in a code while avoiding an effect due to nonfunctional difference during comparison between two projects. In addition, even if there is a difference between projects, specific characters (@SUP_MDIFF) may be inserted into the annotation (additional information) to ignore the difference using the annotation (additional information and, thus, a change and difference intended by a developer need not be reported any longer.

In the comparing of the function flow graphs (S300), the flow graph comparator 120 may compare the function flow graphs for each project, generated by the flow graph generator 110, to deduce a difference and changes.

In the tracking of the changes (S400), the changes tracker 130 may track changes in association with the change management unit 200 based on information obtained by recording the difference and changes deduced through the flow graph comparator 120 in annotation. To this end, the information on the requirement and ID by the request for a change as annotation (additional information) may be received from the change management unit 200, a change tracking result may be generated, and a change tracking result may be transmitted to the change management unit 200.

The change management unit 200 may receive the change tracking result from the changes tracker 130 and may collect and manage the change tracking result.

In the displaying of the change tracking result (S500), the changes tracker 130 may transmit the generated change tracking result to the display element 300, and the display element 300 may display the received change tracking result.

Figure 4:
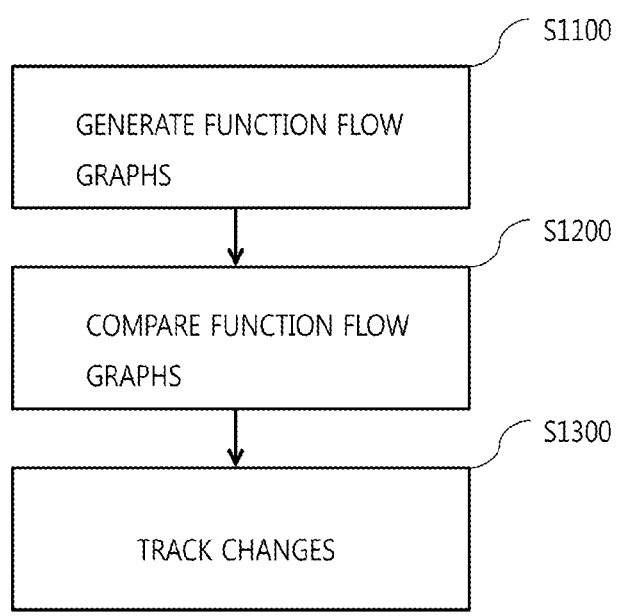
FIG. 4 is a diagram showing a method of tracking and managing a code change between multiple projects according to another embodiment of the present disclosure.

FIG. 4 is a diagram showing a method of tracking and managing a code change between multiple projects according to another embodiment of the present disclosure.

As shown in FIG. 4, the method of tracking and managing a code change according to the present disclosure may include generating a function flow graph (S1100), comparing function flow graphs (S1200), and tracking changes (S1300). According to another embodiment of the present disclosure, the method of tracking and managing a code change generating the function flow graphs by analyzing a structural and functional flow and annotated annotation from the project code input to the code management unit (S1100), comparing the generated function flow graphs for respective projects to deduce a difference and changes (S1200), and tracking changes based on information recorded in annotation formed by annotating the difference and changes deduced in the comparing, generating a change tracking result, and transmitting the change tracking result to a change management unit or transmitting the change tracking result to a display element (S1300).

In the generating of the function flow graphs (S1100), the function flow graphs may be generated for each project code and may be generated based on a functional flow of a code instead of a physical difference between codes to track a change in code while avoiding an effect based on a non-functional difference during comparison between two projects.

In the comparing of the function flow graphs (S1200), specific characters may be inserted into annotated additional information and, thus, a flow graph comparator may not recognize a difference between project codes with respect to a change and difference intended by a developer.

The method of tracking and managing a code change according to embodiments of the present disclosure may be embodied in the form of a program command to be executed through various elements for electrically processing information and may be recorded in a storage medium. The storage medium may store program commands, data files, data structures or combinations thereof.

The program commands recorded in the storage medium may be specially designed and configured for the present disclosure or be known to those skilled in the field of computer software. Examples of a computer readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include a machine language code created by a compiler and a device for electrically processing information using an interpreter, etc., for example, a high-level language code executable by a computer.

As described above, according to the present disclosure, changes in codes of similar projects with the same or similar code bases may be easily tracked and whether required changes are applied to separate projects may be effectively managed.

Flow graphs may be generated and two projects may be compared with a focus on a functional flow of a code instead of a physical difference between codes to track a change in codes while avoiding an effect based on a nonfunctional difference.

A change and difference intended by a developer may not be reported any longer through a function of ignoring a difference using annotation (additional information) even if there is the difference.

In addition, when the reason and description of a change, an identifier (ID) by the request for a change, or the like are recorded in annotation and the recording is operatively associated with a requirement management system and an issue tracking system, changes may be more effectively tracked or managed.

Accordingly, it will be obvious to those skilled in the art to which the present disclosure pertains that the present disclosure described above is not limited to the above-mentioned exemplary embodiments and the accompanying drawings, but may be variously substituted, modified, and altered without departing from the scope and spirit of the present disclosure.

What is claimed is:

1. An apparatus of tracking and managing a code change between multiple projects, comprising: a storage medium;
   a code management unit for generating function flow graphs by analyzing a structural and functional flow and annotated annotation from a project code input to the code management unit, comparing the generated function flow graphs for respective projects, and tracking changes based on information recorded in annotation formed by annotating a difference and changes deduced via comparison and generating a change tracking result;
   a change management unit for providing information on requirement and an ID by a request for a change of additional information as annotated annotation, receiving the change tracking result from the code management unit, and managing the change tracking result; and
   a display element for receiving the change tracking result from the code management unit and displaying the change tracking result on a monitor;
   wherein the apparatus inserts specific characters into the annotated additional information without recognition of a change and a difference between project codes by a flow graph comparator, with respect to a change and a difference intended by a developer.

2. The apparatus of claim 1, wherein the code management unit includes:
   a flow graph generator for generating function flow graphs by analyzing a structural and functional flow and annotated annotation from the input project code;
   the flow graph comparator for comparing the generated function flow graphs for respective projects; and
   a changes tracker for tracking changes based on information recorded in annotation formed by annotating the difference and changes deduced by the flow graph comparator and generating a change tracking result.

3. The apparatus of claim 2, wherein the changes tracker receives the information on requirement and an ID by the request for a change as annotated annotation from a change management unit, transmits a change tracking result to the change management unit, and transmits the change tracking result to the display element.

4. The apparatus of claim 2, wherein the flow graph generator generates a function flow graph for each project code and generates the function flow graphs based on a functional flow of the code instead of a physical difference between codes to track a change in code while avoiding an effect based on a nonfunctional difference during comparison between projects.

5. The apparatus of claim 1, wherein the code management unit includes:
   a flow graph generator for generating function flow graphs by analyzing a structural and functional flow and annotated annotation from an input project code;
   the flow graph comparator for comparing the generated function flow graphs for respective projects; and
   a changes tracker for tracking changes based on information recorded in annotation formed by annotating the difference and changes deduced by the flow graph comparator, generating a change tracking result, and transmitting the change tracking result to a change management unit or transmitting the change tracking result to the display element.

6. The apparatus of claim 5, wherein the flow graph generator generates a function flow graph for each project code and generates the function flow graphs based on a functional flow of the code instead of a physical difference between codes to track a change in code while avoiding an effect based on a nonfunctional difference during comparison between projects.

7. A method of tracking and managing a code change between multiple projects, the method comprising:
   receiving information on requirement and an ID by the request for a change of additional information annotated in a project code from a change management unit, by a code management unit;
   generating function flow graphs by analyzing a structural and functional flow and annotated annotation from the project code input to the code management unit;
   comparing the generated function flow graphs for respective projects to deduce a difference and changes;
   tracking changes based on information recorded in annotation formed by annotating the difference and changes deduced in the comparing and generating a change tracking result; and receiving the generated change tracking result and displaying the change tracking result on a monitor; and
   inserting specific characters into the annotated additional information without recognition of a change and a difference between project codes by a flow graph comparator, with respect to a change and a difference intended by a developer.

8. The method of claim 7, wherein the tracking of the changes further includes receiving the change tracking result from the code management unit and managing the change tracking result, by the change management unit.

9. The method of claim 7, wherein the generating of the function flow graphs includes generating a function flow graph for each project code and generating the function flow graphs based on a functional flow of the code instead of a physical difference between codes to track a change in code while avoiding an effect based on a nonfunctional difference during comparison between projects.

10. A code management method of tracking and managing a code change between multiple projects, the method comprising:
    generating function flow graphs by analyzing a structural and functional flow and annotated annotation from a project code input to a code management unit;
    comparing the generated function flow graphs for respective projects to deduce a difference and changes;
    tracking changes based on information recorded in annotation formed by annotating the difference and changes deduced in the comparing, and generating a change tracking result,
    transmitting the change tracking result to a change management unit or transmitting the change tracking result to a display element; and
    inserting specific characters into the annotated information without recognition of a change and a difference between project codes by a flow graph comparator, with respect to a change and a difference intended by a developer.

11. The method of claim 10, wherein the generating of the function flow graphs includes generating a function flow graph for each project code and generating the function flow graphs based on a functional flow of the code instead of a physical difference between codes to track a change in code while avoiding an effect based on a nonfunctional difference during comparison between projects.

12. A non-transitory computer readable recording medium comprising a program for executing the method of claim 7.

* * * * *